Aug. 2, 1927.
J. BURBACH
DRAFT COUPLING
Filed March 18, 1926    2 Sheets-Sheet 1
1,637,854
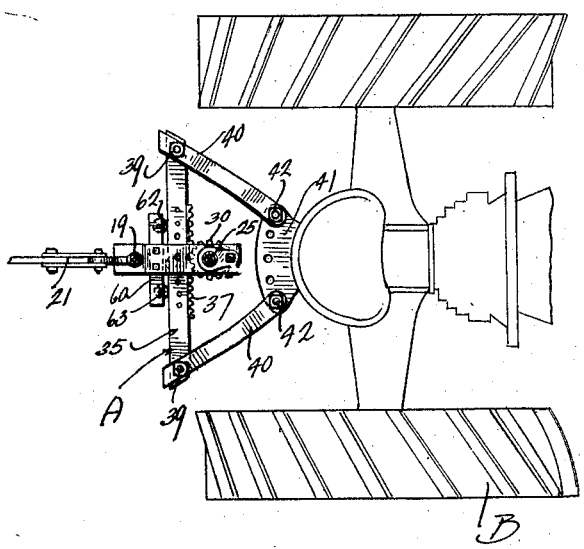
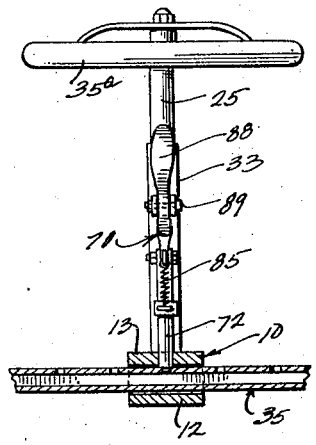
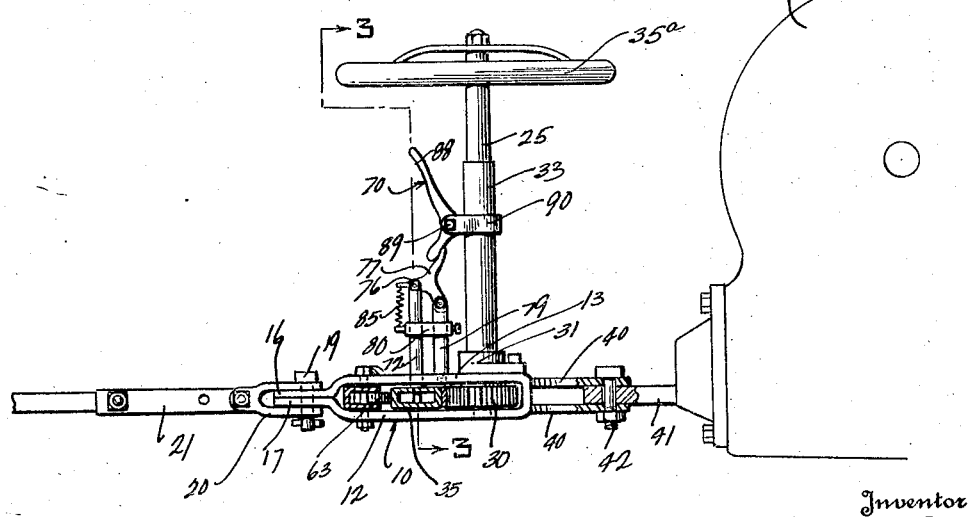
Inventor
John Burbach
By Lancaster and Allwine
Attorneys Aug. 2, 1927. 1,637,854
J. BURBACH
DRAFT COUPLING
Filed March 18, 1926  2 Sheets-Sheet 2
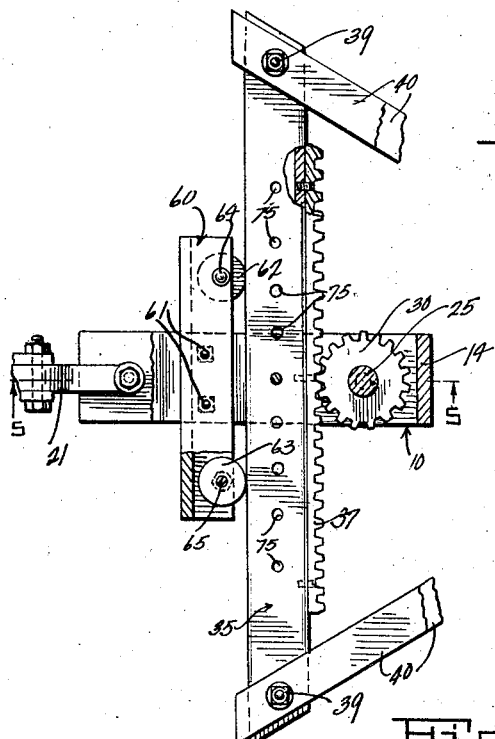

Patented Aug. 2, 1927.

1,637,854

UNITED STATES PATENT OFFICE.

JOHN BURBACH, OF BANGOR, WISCONSIN.

DRAFT COUPLING.

Application filed March 18, 1926. Serial No. 95,711.

This invention relates to improvements in hitches or couplings adapted for use between driven and draft vehicles for propelling the latter.

The primary object of this invention is the provision of improved draft rigging or gearing embodying a very durable construction which is adjustable as to the line of draft, with respect to the drive vehicle, for the purpose of equalizing pull; for the purpose of facilitating turns of the driven and draft vehicles; for the purpose of enabling a lateral relative shifting of the draft and driven vehicles; and in order to permit of an equalization of the pull under different circumstances.

Other objects and advantages of this invention will be apparent during the course of the following detailed description.

In the accompanying drawings, forming a part of this specification, and wherein similar reference characters designate corresponding parts throughout the several views, Figure 1 is a plan view of the improved hitch or draft coupling showing the same connected with a tractor.

Figure 2 is a view, partly in section, partly in side elevation, showing the improved draft gear or coupling.

Figure 3 is a sectional view taken substantially on the line 3—3 of Figure 2.

Figure 4 is an enlarged fragmentary sectional view taken through details of the improved hitch or coupling.

Figure 5 is a sectional view taken substantially on the line 5—5 of Figure 4.

Figure 6 is a plan view of the improved hitch or coupling showing its adaptation to a horse driven implement, such as a harrow.

Figures 7 and 8 are sectional views taken substantially on their respective lines in Figures 5 and 6 of the drawings.

In the drawings, wherein for the purpose of illustration is shown only a preferred embodiment of the invention, the letter A may generally designate the improved draft rig, coupling, or gear which is adapted to be used in connection with many types of propelling vehicle, such as a tractor B or a horse connecting evener C for the propelling of various draft implements, such as plows, harrows, derricks, etc.

The improved draft gear A preferably comprises a main frame part 10 preferably formed of strap iron or some analogous material, and comprising an elongated loop-shaped body having the opening 11 transversely therethrough. The opening 11 is formed by doubling the material of the frame 10 upon itself to provide the straight lower and upper walls 12 and 13 respectively, which are integrally connected at their similar ends by a transverse right angulared wall or connection 14. At the opposite end the frame ends 16 and 17 are doubled in abutting relation and appropriately welded or secured together in any approved relation; said ends 16 and 17 being transversely apertured at 18 for the reception of a pivot or king bolt 19 to which a clevis 20 of a draw bar or element 21 may be connected as is illustrated in the various views of the drawings.

A rotatable shaft 25 rotatably bears in suitable openings provided in the top and bottom walls 12 and 13 of the traveling frame 10, at the end of the said frame adjacent the connecting wall 14; this shaft 25 extending upwardly in right angled relation above the top wall 13, and in the space 11 between the bottom and top walls 12 and 13 having a pinion 30 keyed thereon for rotation in said opening 11 formed by the loop-shaped frame. On the top wall 13 a bearing collar 31 may be secured as at 32, which receives therein an upwardly extending stationary hollow sleeve 33 thru which the shaft 25 rotatably extends in a bearing relation therein; the shaft 25 at its upper end projecting above the top edge of the sleeve 33 and having a hand wheel 35$^a$ or other element secured thereon whereby to permit rotation of the shaft 25.

The frame 10 is adapted to travel along a stationary frame bar 35 which is adapted for connection to the draft implement or apparatus, such as the tractor B or the evener C. This bar or frame 35 is preferably straight, and formed of hollow metal which is polygonal in cross section, preferably rectangular, although the same may be solid if desired. The frame bar 35 is slidably extended transversely thru the opening 11 of the traveling frame 10, and is adapted to support the frame 10 for traveling thereon. The frame bar 35 is supported at one side of the pinion 30, and the bar 35 is provided with a preferably detachable rack 37, having a plurality of spaced teeth thereon of a nature to intermesh with the teeth of the pinion 30, so that upon rotation of the pinion 30 the frame 10 may be fed along the bar 35 transversely of the axis of the drive vehicle.

At its extreme outer end the supporting bar or frame 35 is provided with pivot or connecting bolts or pins 39, each of which pivotally supports a pair of connecting straps 40 secured upon the bolts 39 at the top and bottom surfaces of the bar 35, the pair of straps or connecting rods 40 at each end of the bar 35 being adapted for connection to a draw bar cap 41 or the like of the drive vehicle B by means of bolt or pin connections 42, as is illustrated in Figure 1 of the drawings. It is thus to be noted that the straps 40 at each end of the bar 35 are in spaced relation, and when connected to the draw bar 41 the straps 40 are disposed in a converging relation from the frame 35 to the draw bar cap 41; the bolts which connect the straps and the bar 35 of course supporting the latter in a transverse right angled relation with respect to the line of draft.

Other arrangements may be associated with the straps 40 in order to effect attachment of the improved draft rig to other implements, such as the harrow F illustrated in Figure 5 of the drawings. Thus, as is illustrated in Figures 6 and 8 of the drawings, for attachment to an implement F the straps 40 may be pivotally moved on their pins or bolts 39 until they are in substantially a parallel relation, and the outer ends thereof may then be connected by the bolts 42 above mentioned to a beam 50 of the implement F. Intermediate their ends each pair of straps 40 supports a bolt 55 upon which a brace 56 may be pivotally and detachably connected; the same preferably being held against the bottom strap 40 by means of a spaced sleeve 57. These braces 56 are adapted to be disposed in an outwardly extending divergent relation from the straps for connection at their outer ends to the beam 50 at the outer ends of said beam by pins 58 or analogous elements.

In order to stabilize the transverse sliding of the coupling frame 10, as well as to facilitate such sliding and prevent tipping of the parts, it is preferred to place a transverse member 60 thru the opening 11 of the frame 10; the same being bolted at 61 to the frame so that the opposite ends thereof extend beyond the side edges of the frame 10. This member 60 is preferably a piece of channel iron, although the same may be of any approved stock material, and the same supports rollers 62 and 63 at opposite sides of the frame 10, upon pins 64 and 65 respectively, so that the outer segmental portions of the rollers 62 and 63 extend beyond a longitudinal edge of the channel 60 and thru the open side of the channel 60 for abutment with the side edge of the bar 35 opposite the rack 37. These rollers 62 and 63 while rigidly shown attached to the channel 60 may be adjustably attached thereto, and they hold the pinion 30 and the teeth of the rack 37 in intermeshing relation, with a slidable connection for the bar 35 which cannot be tipped from a right angular adjustment with respect to the frame 10, as is obvious.

Novel means 70 is provided for locking the coupling frame 10 in a stationary relation along any portion of the frame bar 35. This means 70 preferably comprises a plunger or locking bolt 72 which is reciprocally supported thru an opening 73 of the frame 10, so that a reduced locking extension 74 at its lower end may be inserted selectively into any of a series of openings 75 which are provided longitudinally along the bar 35. It is readily apparent that when the plunger 72 is adjusted into the opening 73 and one of the openings 75, the coupling frame 10 will be locked against movement upon the bar 35. The plunger 72 at its upper end is pivotally connected at 76 with a lever 77; the said lever 77 being pivotally connected at 78 upon the upper end of a standard 79 which is detachably threaded in the top wall 13 of the frame 10. To stabilize the movement of the plunger 72 a loop-shaped strap 80 is bolted to the standard 79, and slidably encircles the plunger 72. A spring 85 is connected at one end with the strap 80 and at its opposite end with a lug 86 upon the lever 77, having a tendency to normally throw the plunger 72 into locking engagement in an opening of the coupler bar 35. This spring thus holds the plunger 72 in a locking relation until it is manually lifted to permit transverse adjustment of the frame 10 along the bar 35.

Means is provided to operate the lever 77 and lift the plunger 72 from locking engagement with the bar 35 comprising a substantially L-shaped lever 88 pivoted intermediate its ends at 89 upon a strap 90 which is carried by the bearing sleeve 33; the said lever 88 having an operating portion 91 and a portion 92 adapted to slidably operate against a finger 95 formed with the lever 77. Upon downward pressure upon the portion 91 the lever 88 will be rocked upon its pivot to move the portion 92 against the finger 95 and thus throw the lever 77 upwardly at its plunger connected end for withdrawing the plunger from a locking engagement with an opening 75 of the bar 35, as is readily apparent.

From the foregoing description of this invention it is apparent that novel draft gear or rig has been provided for use in connection with drive and driven vehicles. The device is susceptible of universal application in many ways to different types of draw bar caps and other hitch connections of vehicles, and as is illustrated in Figures 1 and 6 of the drawings two different ways are shown for utilizing the improved hitch, the hitch or coupling in these two views being reversed. In all instances, however, the draft is directed thru the pinion 30 directly to the shaft 25, independent of the manner in which the draft and driven vehicles are applied to the improved coupling.

Various changes in the shape, size, and arrangement of parts may be made to the form of invention herein shown and described, without departing from the spirit of the same or the scope of the claims.

I claim:

1. In draft gearing the combination of an elongated bar, implement connecting members pivotally connected on vertical axes at the outer ends of said bar, a coupling slidable on the bar between said implement connecting members, a draw bar device connected with the last mentioned member, and means to lock the said last mentioned member in any desired position along said bar.

2. In a hitch of the class described an elongated loop-shaped frame providing an opening therealong open at the sides thereof, a bar slidable thru said opening with respect to said frame, a shaft rotatably carried by the frame at one side of the bar, a pinion keyed on said shaft, a rack including teeth carried on a side of the bar in meshing relation with the teeth of the pinion, means carried by the frame to maintain the rack and pinion in intermeshing relation, and a draft line connected to the frame at an end thereof and at the opposite side of the bar with respect to said pinion whereby upon the application of a pull the force will be transmitted directly to the pinion shaft.

3. In a draft rig the combination of a narrow elongated loop-shaped frame having an opening therein open at the sides of the frame, an elongated bar transversely slidable thru the opening of the frame with respect to said frame, a rack supported at one side by said bar, a shaft rotatably carried at an end of said frame extending transversely thru the opening of the frame, a pinion rotatably keyed on the rotatable shaft within the opening of said frame and in meshing relation with the rack, and draft line means directly connected at the end of said frame remote from the shaft and to the opposite side of the bar with respect to the pinion.

4. In a draft rig the combination of a narrow elongated loop-shaped frame having an opening therein open at the sides of the frame, an elongated bar transversely slidable thru the opening of the frame with respect to said frame, a rack supported at one side by said bar, a shaft rotatably carried at an end of said frame extending transversely thru the opening of the frame, a pinion rotatably keyed on the rotatable shaft within the opening of said frame and in meshing relation with the rack, draft line means connected at the end of said frame to the opposite side of the bar with respect to the pinion, a member rigidly connected in transverse relation upon the frame at the opposite side of the bar with respect to the pinion having end portions projecting beyond the sides of said frame, and rollers rotatably supported on said member at the outer ends thereof in rolling engagement with the side of the bar opposite the rack.

5. In a draft rig the combination of a narrow elongated loop-shaped frame having an opening therein open at the sides of the frame, an elongated bar transversely slidable thru the opening of the frame with respect to said frame, a rack supported at one side by said bar, a shaft rotatably carried at an end of said frame extending transversely thru the opening of the frame, a pinion rotatably keyed on the rotatable shaft within the opening of said frame and in meshing relation with the rack, draft line means connected at the end of said frame to the opposite side of the bar with respect to the pinion, a member rigidly connected in transverse relation upon the frame at the opposite side of the bar with respect to the pinion having end portions projecting beyond the sides of said frame, rollers rotatably supported on said member at the outer ends thereof in rolling engagement with the side of the bar opposite the rack, and independently movable connecting straps pivotally mounted on the outer ends of said bar.

6. In a draft rig the combination of a narrow elongated loop-shaped frame having an opening therein open at the sides of the frame, an elongated bar transversely slidable thru the opening of the frame with respect to said frame, a rack supported at one side by said bar, a shaft rotatably carried at an end of said frame extending transversely thru the opening of the frame, a pinion rotatably keyed on the rotatable shaft within the opening of said frame and in meshing relation with the rack, draft line means connected at the end of said frame to the opposite side of the bar with respect to the pinion, a member rigidly connected in transverse relation upon the frame at the opposite side of the bar with respect to the pinion having end portions projecting beyond the sides of said frame, rollers rotatably supported on said member at the outer ends thereof in rolling engagement with the side of the bar opposite the rack, said bar having a series of openings therealong paralleling the teeth and the frame having an opening therein adapted to align with any of the series of openings of the bar, and a locking plunger adapted to be releasably extended thru the aligning openings of the frame and bar to lock the frame and bar against relative movement.

7. In a draft rig the combination of an implement coupling frame, a bar movably supported on the frame for transverse sliding with respect thereto, means to cause relative movement of the frame and bar transversely with respect to each other, means to releasably connect the frame and bar against relative movement, and upper and lower connecting straps pivotally mounted at each of the outer ends of said bar.

8. In a draft rig the combination of an implement coupling frame, a bar movably supported on the frame for transverse sliding with respect thereto, means to cause relative movement of the frame and bar transversely with respect to each other, means to releasably connect the frame and bar against relative movement, upper and lower connecting straps pivotally mounted at each of the outer ends of said bar, means at the outer ends of each of the pair of straps at the outer ends of the bar for connection to an implement, and brace means pivotally connected intermediate each pair of straps and having connecting bolt means at the outer ends thereof.

9. In draft rig of the class described the combination of a coupling frame, a bar on which the coupling frame is slidably mounted, a rack connected on the bar, a shaft rotatably supported by the frame and extending upwardly therefrom, a pinion keyed on the shaft in meshing relation with the rack whereby upon rotation of the shaft the frame may be fed along said bar, a draft line connected with said frame, means carried by the bar for connecting the same to a vehicle or implement, a bearing sleeve rigid with the frame in which the shaft bears, said bar having a series of openings therealong and the frame having a single opening therein adapted to have any of the openings of the bar align therewith, a standard mounted upwardly on the frame, a lever pivoted at one end on the standard, a plunger pivoted at the other end of the lever and adapted to extend into releasable relation with the aligning openings of the frame and bar, spring means acting on the lever normally to hold the plunger in locking engagement in the aligning openings of the frame and bar, a lever pivoted intermediate its ends on the sleeve of the shaft, and a finger formed on the first mentioned lever against which the last mentioned lever operates to withdraw the plunger from the aligning openings of the frame and bar.

10. In a hitch the combination of a narrow elongated looped frame having an elongated opening therein opening at the sides thereof, a bar transversely slidable thru said opening of the looped frame, teeth rigid at one side of the bar, a pinion rotatably supported on said frame in the opening at one end thereof and in meshing relation with said teeth, a transverse channel shaped member supported in the end of the opening at the opposite side of the bar from said pinion and in right angled relation to said looped frame, the groove of said channel shaped member directly facing the bar, and rollers rotatably supported in said groove partially extending beyond the bar facing edge of said channel frame and in engagement with the edge of the bar opposite the teeth.

JOHN BURBACH.